Patented Oct. 21, 1952

2,615,046

UNITED STATES PATENT OFFICE 2,615,046

2,2'-METHYLENEBIS(4-CHLORO-6-AMINOPHENOL)

Herman E. Faith, New Palestine, Ind., assignor to Allied Laboratories, Inc., Kansas City, Mo., a corporation of Delaware No Drawing. Application June 23, 1950,
Serial No. 170,037

1 Claim. (Cl. 260—570)

The present invention relates to the new compound 2,2'-methylenebis(4-chloro-6-aminophenol) and a method for its preparation.

My new compound 2,2'-methylenebis(4-chloro-6-aminophenol) possesses a reactive amino group and a hydroxy group and is useful as an intermediate in organic synthesis. It is of especial interest in the preparation of organic dyes and resinous substances. In addition, my new compound has been shown to possess anthelmintic action and may be employed as a constituent of veterinary medicine.

My invention will be described in greater detail in conjunction with the following example—it being understood that the example is given by way of illustration and not limitation.

STEP 1

*Preparation of 2,2'-methylenebis-(4-chloro-6-nitrophenol)*

Sixty-eight grams of 2,2'-methylenebis(4-chlorophenol) are dissolved in 550 ml. of glacial acetic acid and 33.8 g. of fuming nitric acid (d. 1.5) in 50 ml. of glacial acetic acid are added gradually. The temperature is kept at 10–15° C. during the addition; then the mixture is stirred at 25–30° C. for 1.5 hours. It is cooled and the product is collected by filtration.

STEP 2

*Preparation of 2,2'-methylenebis(4-chloro-6-aminophenol)*

Sixteen grams of hydrogen chloride are dissolved in 28 ml. of 95% ethanol. To this cold solution are added 20.6 g. of stannous chloride dihydrate. Then 5 g. of 2,2'-methylenebis(4-chloro-6-nitrophenol) are stirred into the solution at 25° C. The temperature rises gradually to 35° C. From this point, the temperature's rise is controlled by an ice bath to keep the mixture from getting hotter than 80° C. The solution is heated at 80° C. for one hour, cooled and filtered. The solid product is dissolved in water and hydrogen sulfide is introduced to precipitate tin sulfide. The sulfide is filtered from the solution, and the filtrate is neutralized to pH5 with sodium hydroxide solution. The precipitate is dissolved in dilute hydrochloric acid, stirred with activated charcoal and precipitated again by neutralizing with sodium hydroxide. It crystallizes from dilute ethanol. It melts with decomposition at 230–232° C. when inserted at 225° C.

I claim:

The compound 2,2'-methylenebis(4-chloro-6-aminophenol).

HERMAN E. FAITH.

REFERENCES CITED

The following references are of record in the file of this patent:

UNITED STATES PATENTS

| Number | Name | Date |
|---|---|---|
| 1,210,751 | Anderwert et al. | Jan. 2, 1917 |
| 2,378,453 | Winmayr | June 19, 1945 |
| 2,464,194 | Zimmerman | Mar. 8, 1949 |

OTHER REFERENCES

Marsh et al., "Ind. and Eng. Chem.," vol. 41, page 2181 (1949).